---

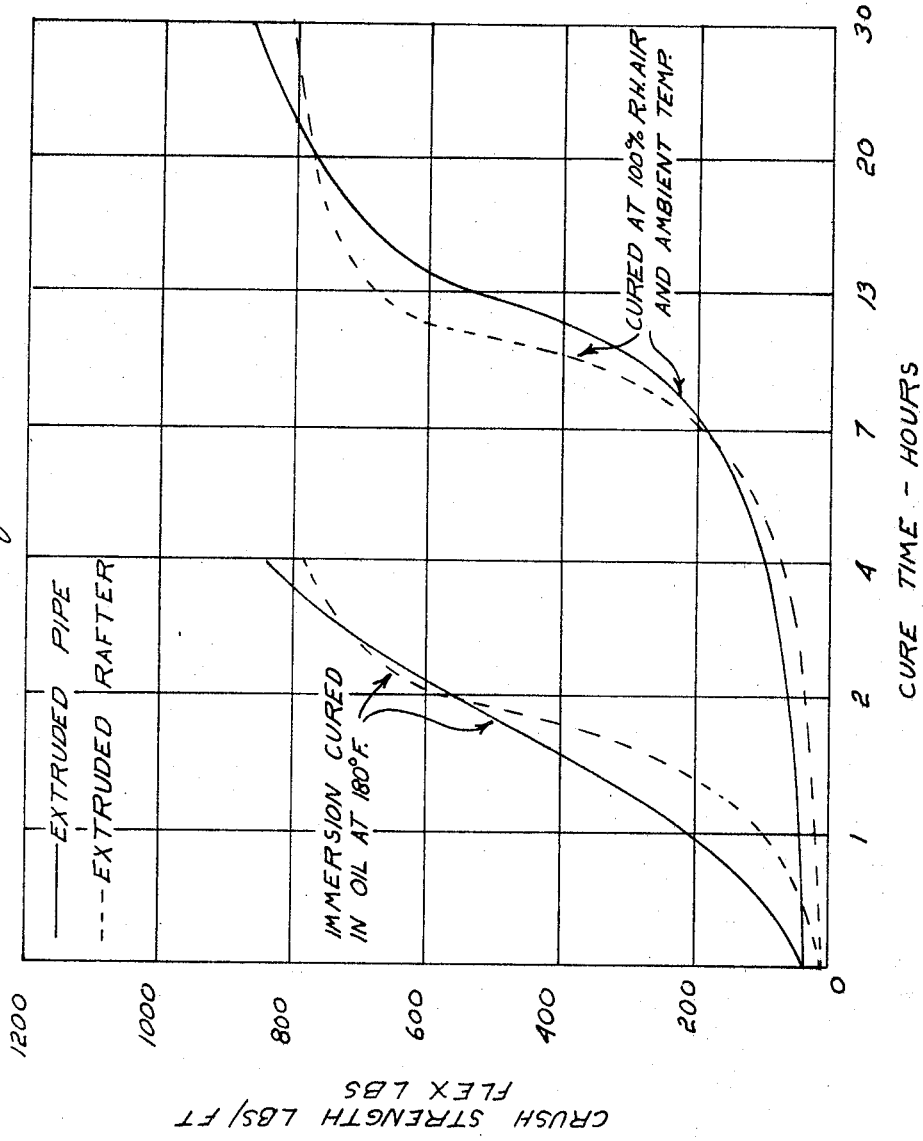
Fig. A 3,428,721
METHOD OF CURING HYDRAULIC CEMENT
Joseph C. Jackson, Ambler, and Willard R. Seipt, Glenside, Pa., assignors to Certain-Teed Products Corporation, Ardmore, Pa., a corporation of Maryland
Filed Sept. 6, 1966, Ser. No. 577,386
U.S. Cl. 264—79      14 Claims
Int. Cl. C04b 41/30; C09k 3/00

ABSTRACT OF THE DISCLOSURE

Process for improved curing of articles made from hydraulic cement wherein the freshly formed cement article is immersed in a heated water-immiscible liquid bath and maintained in the bath for at least a period of time until the cement has set sufficiently for the article to become self-supporting, the heat of the liquid bath accelerating cement hydration, the water-immiscible liquid preventing the evaporation of water from the cement article.

---

This invention relates to the production of articles comprising hydraulic cement and more particularly, to an improved method for curing shaped wet hydraulic cement compositions, said method employing heat to facilitate and accelerate the rate of cement hydration while providing at the same time positive method steps for minimizing evaporation of the water from the composition.

"Cement" as used herein means hydraulic cement.

In accordance with the present invention provision is made for accelerating the hydration of cement by heating the article under a condition in which the surface of the article is covered with a water-immiscible liquid acting as a barrier preventing or inhibiting the evaporation of water from the article being cured.

In accordance with the preferred practice of the present invention, the covering of the surface of the article with a water-immiscible liquid barrier is achieved by immersing the wet, freshly formed article in a bath of a water-immiscible liquid, the heat transfer preferably being effected by employing a heated bath of such liquid.

The technique of the present invention is more fully elaborated hereinafter following preliminary consideration of certain prior known techniques, after which various of the objects and advantages of the method of the present invention are also set out.

In the production of cement articles or fibrous-cement articles, such as, for example, asbestos-cement pipes and sheets, it is necessary that the shaped wet cement composition be cured properly in order to produce an article having good strength. Unfortunately, hydration of cement is a slow process when effected at temperatures in the neighborhood of room temperature. Under such temperature conditions, it takes several hours or even a few days, depending on the setting properties of the cement and the shape of the article, for the cement to set sufficiently so that the article can be handled without damaging or deforming it. Many days or a few weeks may pass before the cement has set sufficiently to allow the article to be subjected to any necessary finishing process, such as, machining, or before it can be put to use. Consequently, curing these compositions at room, or even slightly higher temperature is not entirely satisfactory because it creates a bottleneck in the production process of the cement article.

The hydration of cement or fibrous-cement compositions may be accelerated by maintaining the wet composition in a heated environment such as an oven. However, the water in the composition, whether it be at room temperature or in a heated environment, tends to egress to the surface of the composition and evaporate therefrom unless steps are taken to retard or prevent the evaporation. Heating the wet composition, of course, increases the rate at which evaporation would occur.

Evaporation of the water from the wet cement or fibrous-cement composition causes at least three undesirable effects.

First, continued evaporation will reduce the amount of water present in the composition below the stoichiometric amount necessary to react with all of the cement. Unreacted cement present in the article causes the article to have lower strength.

Second, since cement gel forms not only on the surface of cement grains but also in all the available capillary spaces which are promoted by and filled with water, the water which evaporates reduces the space in which the products of hydration can form. The loss of water results in a drying shrinkage and gradual restriction of available space thereby causing the product to have lower strength.

Third, as the water evaporates from the composition, heat which otherwise would be available to promote the reaction between the cement and water is lost from the composition in the form of latent heat of vaporization.

Two prior general methods described just below, neither of which is entirely satisfactory, are known for attempting to accelerate the rate of hydration while maintaining a sufficient amount of water in the composition to insure proper curing.

In one prior method, the shaped wet cement or fibrous-cement composition is cured in a moderately heated environment, and the maintenance of sufficient water in the composition is attempted to be accomplished by an effort to replace the water which evaporates, e.g., by sprinkling or spraying the composition with water. However, this wetting down procedure generally can be employed only after a certain amount of hydration has occurred and some physical set has taken place, and if employed prior thereto, the shaped composition has a tendency to blister, swell, and if laminar, to delaminate, any of which weakens the structure of the composition. Thus, this method requires that the cement be allowed to initially set to some degree prior to the imposition of the curing conditions which are supposed to accelerate the cure. Initial set usually must be accomplished under conditions such that setting is slow and some evaporation occurs and, consequently, curing according to this method has distinct disadvantages.

The other known method is to cure the cement composition in a partially confined space, such as a tunnel, which contains heated and humidified air. The effort in this technique is to maintain the environment in the tunnel humidified sufficiently to either prevent evaporation or retard the rate of evaporation of the water from the composition.

In order to prevent evaporation of the water from the composition, it is necessary that the heated tunnel air be totally saturated with water. Such condition is quite difficult to maintain at temperatures elevated more than a few degrees. At temperatures high enough so that significant increases in the rate of acceleration of the hydration are obtained, it is not feasible to maintain humidified air at atmospheric pressure in a confined or partially confined space at 100% saturation. This is because the capacity of air to hold water vapor increases exponentially with temperature so that at temperatures of about 160° F. and higher (at which temperatures significant increases in the rate of hydration would be realized), the amount of water vapor that the air can hold is so great that it is impractical and well nigh impossible to provide and maintain a totally saturated environment at atmospheric pressure.

The maintenance of saturation conditions can be aided by the use of pressures above atmospheric but then the tunnel approach is not possible. It is possible, by the utilization of high pressure steam, to water saturate a confined space at high temperatures and cure cement articles in this confined environment, such process being known as high pressure steam curing, commonly referred to as autoclaving. However, the quality requirements of some cement or fibrous-cement articles do not justify the cost of high pressure steam curing equipment. Furthermore, in processes where such equipment is necessary for the proper production of the article and tolerable from an economic standpoint, it is nevertheless essential that the articles be precured to some extent before being subjected to the high pressure steam curing so that the articles will be handleable, that is, capable of being handled without damage and so that product does not degrade upon high-pressure steam curing. Such precuring is done under conditions where cement hydration is, again, relatively slow.

Thus, while from a theoretical standpoint, it appears that curing the composition in hot air which is totally saturated is a good method for accelerating the hydration of cement while preventing water evaporation, experience has shown that it is generally not a practical method at temperatures above 160° F.

In addition, there are disadvantages in curing the cement composition in heated and partially humidified air. One disadvantage is that water will evaporate from the composition under such conditions, thereby creating the risk that the composition will be dried instead of cured, at least to some extent. The greater the degree of saturation of the air, the slower will be the rate of evaporation; however, the same problems that are prevalent when attempting to provide and maintain hot air totally saturated are also present, but to a somewhat lesser extent, when attempting to keep air at temperatures high enough to increase significantly the rate of hydration and saturated enough to reduce significantly the rate of evaporation.

Another disadvantage of curing the wet cement composition in heated air which is not totally saturated is that the heat in the air is not utilized fully to accelerate the cure of the composition through an increase in cement temperature. As long as the conditions are such that water can evaporate from the composition, the heat in the air will provide the heat of vaporization for the evaporation. Thus, the temperature of the composition is fixed by the wet bulb temperature of the air and can never rise to the actual temperature, i.e., the dry bulb temperature of the air, as long as the composition is wet and evaporation is occurring. For example, the wet bulb temperature of air having a relative humidity of 40% and a dry bulb temperature of 200° F. is 161° F. Therefore, when a wet cement composition is exposed to air having a relative humidity of 40% and a dry bulb temperature of 200° F., its temperature will eventually reach 161° F., at which temperature evaporation occurs freely until the composition begins to dry out, and only when substantially dry will the temperature of the composition begin to increase toward 200° F. Consequently, the cement hydrates at a temperature well below the actual temperature of the air and at a slower rate, of course, than if it were hydrating at 200° F. Raising the relative humidity of the air would raise the wet bulb temperature, and consequently the temperature of the cement, thereby increasing the rate of hydration, but to do so is a problem, as explained above.

Another problem that occurs when the wet cement or fibrous-cement compositions are cured in heated air which is totally or partially water saturated is that there is a tendency for the water vapor in the air to condense in localized sections of the heated humidification chamber. This creates a general nuisance and increases maintenance costs. Also, when the water vapor condenses on the composition itself, as it has a tendency to do, it may have a deleterious effect on the composition, especially during the initial portion of the cure cycle when insufficient physical set has taken place to resist erosion.

Several prior methods are used for curing massive concrete slabs in structures such as roadways, floors, sidewalks, piers, etc. It should be recognized that the conditions necessary for the proper curing of such structures are somewhat different than the conditions which can be employed to cure fibrous-cement articles. In each case, it is necessary that sufficient water for hydration of the cement be maintained in the composition to insure that the resulting structures have maximum strength. However, large concrete slabs should be cured over a long period of time and at an even temperature in order to develop a good product. If not cured at an even temperature, the concrete composition has a tendency to expand or shrink depending on whether the temperature at which it is cured rises or falls. Such expansions and contractions of the composition during its curing can cause the resulting structure to develop cracks and internal stresses. Consequently, heating massive compositions during curing can be detrimental and is normally avoided.

On the other hand, cement articles of smaller cross section are not degraded if the wet shaped composition is exposed to heat during the curing thereof. The dimensional changes that occur in these pieces upon the application of heat do not generally cause the deteriorating effect associated with large slabs.

As discussed above, no completely satisfactory method has been developed heretofore for rapidly curing cement or fibrous-cement articles at temperatures elevated sufficiently so that the maintenance of a saturated environment is difficult without resorting to pressure.

It is therefore, an object of the invention to provide an improved method for the production of articles comprised of cement or fibrous reinforced cement.

Another object of this invention is to provide an improved method for curing cement or asbestos-cement compositions.

An additional object of this invention is to provide an improved method for curing shaped wet cement or fibrous-cement compositions by accelerating the hydration of cement in the composition while maintaining sufficient water in the composition for the proper curing thereof by substantially preventing evaporation of the water from the wet composition.

According to the invention a water-immiscible liquid is utilized as an evaporation barrier at the surface of the article to be cured, the surface of the article preferably being covered with the liquid vapor barrier promptly after the article is formed, so as to promptly inhibit or prevent the evaporation of moisture from the article. In this way provision is made for effecting cure of the article substantially without any loss of moisture therefrom.

How these and other objects are attained and the advantages resulting therefrom will be clear from the following description of this invention and the accompanying drawings in which:

FIGURE 4 is a graph similar to FIGURE 1.

Figure 1:
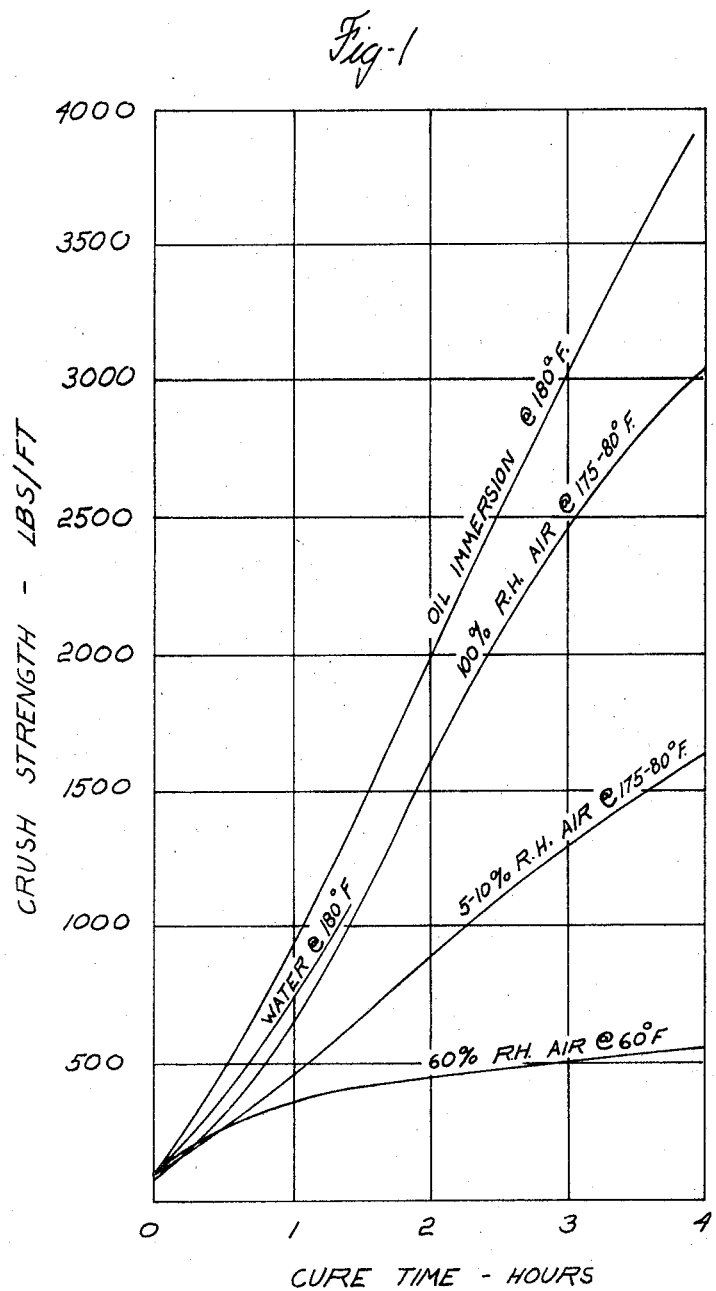
FIGURE 1 is a graph comparing the development of the strength of wet asbestos-cement pipes during curing thereof by the method of this invention with the strength developed in like pipes cured by other methods.

The aforementioned objects and other objects and advantages are attained in accordance with this invention by employing, in the production of cement or fibrous-cement shapes, the method which comprises forming the shape, covering the surface of the shape with a water evaporation barrier, the barrier being a liquid which is substantially immiscible with water, and transferring heat into the shape to hydrate the cement.

The preferred mode of producing cement or fibrous-cement shapes according to this invention is the method comprising forming a wet shape, immersing the wet shape in a water-immiscible liquid, and transferring heat into the wet shape while the surface is so covered, in order to hydrate the cement. In the preferred practice of the invention substantially all of the surface of the wet article is covered with the liquid evaporation barrier, and, in addition, in the preferred practice of the invention heat is transferred to the article through the liquid by heating the liquid.

The transfer of heat to the article should be continued until appreciable setting or curing of the cement occurs, the time required for this purpose being developed more fully herebelow. It may here be noted, however, that some time elapses, for intsance a time of at least about 10 minutes, before the strength of the article being treated begins to improve. In other words no appreciable increase in strength is observable until after the passage of a preliminary period of about 10 minutes. Indeed it will be found that in general the strength of the product diminishes slightly during the first few minutes of immersion in the bath of the heated liquid evaporation barrier.

In general then, this invention provides a method for curing shaped wet cement or fibrous-cement compositions in a heated environment by providing and maintaining a water evaporation barrier comprising a heated water-immiscible liquid between the surface of the composition from which the water in the composition tends to evaporate and the medium into which the water would evaporate. This barrier can be established conveniently by immersing the shaped wet composition into the heated water-immiscible liquid which functions to prevent evaporation of water from the surface of the composition. The water in the composition substantially prevents ingress of the water-immiscible liquid into the shaped wet composition. By maintaining the water-immiscible liquid in a heated condition, the shaped wet composition is maintained in the heated environment necessary to accelerate the curing of the composition. It is thus possible to accelerate the rate of curing the composition by maintaining it in a heated environment while avoiding loss of water from the composition.

The immersion method of curing as described herein includes within its scope systems wherein the wet shaped composition is immersed in the heated water-immiscible liquid and the composition is cured in the liquid while relative motion between the liquid and the composition is maintained or systems wherein there is no relative motion between the liquid and the composition during the curing thereof. Thus, relative motion may be maintained between the wet shaped composition and the liquid, for example, by circulating or moving the liquid on the surface of the shaped composition or the shaped compisition may be moved in the liquid. Although relative motion between the article and the liquid facilitates and accelerates heat transfer, it is not essential.

Curing wet cement or fibrous-cement compositions according to the method of this invention has several important advantages over the methods heretofore available.

It is not necessary when employing the method of this invention to have the cement initially set before the composition is subjected to heat as is required in that method where the composition is cured in a heated environment with sprinkling or spraying means being utilized to replace the water which evaporates from the composition.

When compared to that method which utilizes heated and humidified air, the invention eliminates the problems attendant with providing and maintaining hot air partially or completely saturated as discussed above, because the water-immiscible liquid prevents evaporation and thus there is no necessity to satisfy an air-water relationship.

Another advantage of the invention described herein is that heat transfer from the water-immiscible liquid into the composition occurs at a faster rate than heat transfer from hot air to the composition. Still another advantage is that the temperature of the wet composition can be raised to the temperature of the water-immiscible liquid, whereas, as pointed out above, when the composition is cured in hot, partially saturated air, the temperature of the wet composition, as long as evaporation is occurring, is fixed and does not reach the actual temperature of the air.

The liquid employed as the water evaporation barrier must be immiscible with water at the temperatures employed, i.e., it must be incapable of substantially mixing with water. Additionally, it is preferred that the water-immiscible liquid have the following properties. The boiling point of the liquid should preferably be higher than that of water, so that curing may be conducted at temperatures ranging up to the boiling point of water, without loss of the barrier liquid and without the necessity of raising pressure. The viscosity of the liquid should be low enough to permit rapid heat transfer from the liquid to the composition and to permit the liquid to drain freely from the article after it is removed from the liquid. The water-immiscible liquid also should have a sufficiently high surface tension with water so that that liquid which remains on the article after draining can easily be washed off the article. In addition, the water-immiscible liquid should have low emulsivity to maximize the rate at which a mixture of water and the liquid will separate on standing thereby providing a convenient means for recovering the liquid which is washed off the article. Also, the water-immiscible liquid preferably should be non-smoking, non-toxic, non-reactive with cement or fibrous-cement compositions, have a high flash point and good heat stability and not impart any undesirable properties, for example, color, odor, or taste, etc. to the article, the matter of odor and taste both being of considerable importance with certain types of article, for instance, pipes which are to be used as water supply pipes. It should be understood that it is not necessary that the water-immiscible liquid have all these properties, but it is so preferred.

Exemplary liquids which can be used in the practice of this invention are petroleum and other mineral oils, vegetable oils and derivatives thereof, animal oils and derivatives thereof, water-immiscible organic liquids such as, for example, silicones, organochlorines, fluorocarbons, diphenyl oxide, and other aromatic compounds. Various of the materials which may be employed for the liquid barrer may actually be solids at room temperature, but liquids at the curing temperature. In many cases, of course, materials which are usable are liquids not only at the curing temperature but also at room temperature.

Preferred water-immiscible liquids which can be used to excellent advantage in the practice of this invention are refined mineral oils particularly refined paraffinic and refined naphthenic oils. These petroleum oils are immiscible with water, and various types of these oils having the combination of properties that makes them extremely well suited for carrying out this invention are available. Refined paraffinic and naphthenic oils can be obtained which have viscosities at 75° F. ranging from 5 to 100 centipoises, boiling points and flash points above about 250° F. and higher, little or no tendency to smoke at temperature of 200° F. and higher, good heat stability, little or no tendency to froth or foam, the ability to separate readily from water, and which are non-toxic, non-reactive with cement or fibrous-cement compositions and which do not impart any undesirable characteristics to the cured article. Refined paraffinic and naphthenic oils are well known as as are their methods of manufacture and various types are readily available and are relatively inexpensive.

For best results, the surface of the shaped wet cement or fibrous-cement composition should be covered with the water evaporation barrier before any significant amount of water evaporates. Preferably, the wet composition is immersed in the water-immiscible liquid immediately after the shape has been formed. Although the article may be heated in other ways, it is preferred to heat the article by heating the liquid with which the article is covered or in which the article is immersed. It is most advantageous that the water-immiscible liquid be heated to the desired curing temperature prior to the immersion of the shaped composition; however, no harm, other than delay in hydration will result if the water-immiscible liquid is heated subsequent to the immersion of the shape.

Where the article is heated by heating the water-immiscible liquid, the liquid should be heated to and maintained at temperatures ranging from about 120° F. to about 200° F. and preferably from about 160° F. to about 180° F. during the curing of the composition.

With respect to temperatures lower than about 120° F. it will be appreciated that any temperature higher than room temperature will accelerate the cure to some extent. However, the curing time will be decreased only moderately if the curing is accomplished at temperatures below about 120° F.

Figure 3:
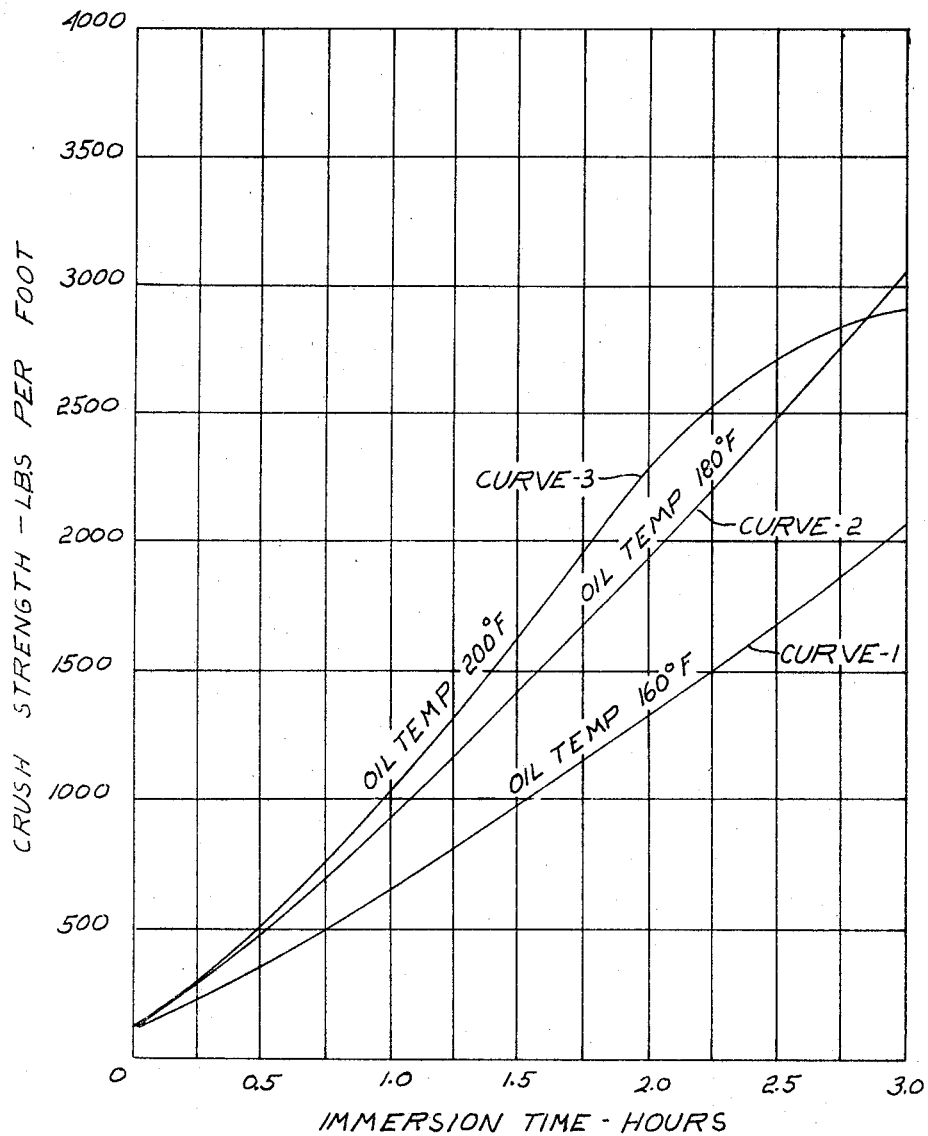
FIGURE 3 is a graph which illustrates the development, at various temperatures, of strength of wet asbestos-cement pipes during curing thereof by the method of this invention.

With respect to the higher temperatures at which curing according to this invention can be carried out, it is necessary to exercise caution when curing at temperatures approaching the boiling point of the water in the composition. It has been found that the rate of strength development of an asbestos-cement pipe immersed in a refined paraffinic oil having a temperature of 200° F. begins to tail off after being immersed for several hours. (See curve 3 in FIGURE 3, discussed hereinafter in detail.) It is theorized that when the article is heated to temperatures approaching 200° F., the heat generated by the exothermic reaction between the cement and water is trapped within the composition by the evaporation barrier and this heat is sufficient to raise the temperature of the water in the composition above the temperature of the barrier and to its boiling point, and also provide the additional heat of vaporization necessary for the water to vaporize. It is believed that the resulting expanding steam disrupts the cement gel formed during the hydration of the cement thereby lowering its strength. For the foregoing reason, it is desirable to effect the curing under conditions which will avoid the vaporization of water within the article.

The boiling point of the water in the composition can be raised by applying pressure to the surface of the water-immiscible liquid. Curing at temperatures higher than those which would normally be used at atmospheric pressure can thus be properly effected by curing under pressure. Some increase in pressure at the surface of the article can also be secured merely by employing a bath of considerable depth and by positioning the articles to be cured toward the bottom of the bath. In this way, some appreciable elevation in temperature may be obtained, without the necessity of resorting to pressurizing equipment.

Cement or fibrous-cement articles can be cured to varying degrees according to the method described herein. It is within the scope of this invention to allow the article to remain immersed in the heated water-immiscible liquid until the cement has hardened sufficiently to allow the article to be put to its intended use. On the other hand, it may be desirable to terminate the curing according to the method described herein as soon as the cement has set sufficiently to impart to the article adequate rigidity and strength so that the article is not vulnerable to damage, such as bending or denting when the article is moved from one place to another. For example, if it is necessary to subject the article to high pressure steam curing, it generally will be expedient to transfer the article from the heated water-immiscible liquid to the autoclave as soon as the article has developed sufficient rigidity and strength through setting of the cement to resist damage during the transfer.

The length of time required to cure the cement or fibrous-cement article will depend on a number of factors. The time will depend on the desired degree of cement hydration and also on the particular type of cement utilized because different cements hydrate at different rates. In addition, the time for curing the article will depend on the temperature of the water-immiscible liquid.

According to the invention, the time of immersion of the article in the heated bath should be sufficient to effect some significant hydration of the cement while the article is in the bath. In general, it will be found that this requires an immersion time of at least about 10 to 15 minutes, depending somewhat upon various of the factors just mentioned. In most instances, of course, it will be preferred to retain the article for a longer period of time so as to take full advantage of the accelerated hydration made possible according to the technique of the present invention. Thus, as is illustrated by examples given herebelow, to effect significant hydration, times running anywhere from 30 minutes up to several and indeed in some cases, many hours, should be used.

In general, any kind of a shaped article made from hydratable cement or fibrous-cement composition which is not degraded when subjected to heat can be cured according to the inventive method described herein.

Asbestos-cement articles, which are used in extremely large quantities, of various shapes and sizes are particularly suited to being cured according to this invention because the wet asbestos fiber reinforced cement composition has very little or no tendency to degrade when subjected to the hot, water-immiscible liquid. Exemplary asbestos-cement articles are straight sections of pipe having inside diameters of from 3″ to 28″ and wall thicknesses of from 0.25 inch to 2.5 inches, curved sections of pipe, joints, endcaps, sheets, boards and other structural elements used in buildings such as box beams.

In general, in addition to water, these asbestos-cement articles are comprised of the following ingredients present in the amounts indicated:

|  | Parts by wt. based on 100 parts of dry ingredients |
|---|---|
| (a) Hydraulic cement | 10–90 |
| (b) Asbestos | 10–50 |
| (c) Auxiliary cementing agents | up to 50 |

The shaped cement or fibrous-cement compositions which can be cured according to the method of this invention can be comprised of any hydraulic cement normally utilized in the production of such articles. Typical examples of such hydraulic cements are portland cements, pozzolana cements, and similar materials.

The various types of fibers normally included in fibrous-cement articles can also be utilized in compositions subjected to the curing method of this invention. Asbestos fibers are especially desirable and with respect to asbestos fibers, the following are typical examples of the kinds that can be used: chrysotile, crocidolite and amosite. Other natural or synthetic fibers may also be used in the fibrous-cement composition.

The auxiliary cementing agents that can be included in the cement-containing compositions described herein are silica flour, pozzolana, diatomaceous earth, and the like.

In addition, the compositions may also contain other materials generally used in hydraulic cement compositions such as, for example, fillers including pulverized limestone, clays and sand, pigments if a colored product is desired, cement accelerators or retarders, wetting agents, flexing agents, plasticizing agents, extrusion-aid additives, etc. Up to about 25 parts (based on 100 parts of dry ingredients) of such materials can be incorporated into the compositions.

The cement or fibrous-cement shape can be formed according to any of the conventional techniques, including molding or extruding the wet composition, or in the case of hollow cylindrical objects such as asbestos-cement pipes, by winding a web of asbestos-cement upon a mandrel, or in the case of flat sheets by winding on an accumulator roll.

If the shaped wet composition is immersed in the water-immiscible liquid immediately after it has been formed, as is preferred, it will normally be necessary to support the shaped composition to prevent it from deforming. This is because the cement or fibrous-cement articles to which this invention relates are generally formed from aqueous cement compositions having a consistency such that the article will not retain its shape, i.e., it is not capable of prolonged self-support, unless the article is provided with a support. For example, a laminated asbestos-cement pipe which has been formed on a mandrel can be supported in the liquid by leaving the mandrel in place and immersing the mandrel and pipe into the water-immiscible liquid bath. By stripping the mandrel from the pipe as soon as the pipe has developed sufficient strength to support itself, the mandrel will be available for the forming of additional pipes. The rigid pipe, free of the mandrel, can then be subjected to additional curing in the bath. If, on the other hand, the asbestos-cement pipe is formed by extrusion operation, the pipe can be supported in a water-immiscible liquid bath on a V-shaped trough. An article such as a box beam or flat sheet or other structural component can be supported conveniently in the liquid by similar V-troughs or racks.

The following example seerves to illustrate the practice of this invention in its preferred embodiment and, in particular, shows the formation of asbestos-cement pipes and curing of the pipes by immersing them into heated refined paraffinic oil. The ingredients which comprise the pipes are given in parts by weight.

Example I

There were mixed 282 parts of Type 1 portland cement, 85 parts of chrysotile and crocidolite asbestos and 200 parts of silica in a dry blender. Forty parts of this dry blend were mixed with 400 parts of water in a propeller type mixer and further diluted with another 400 parts of water containing about 4 to 8 parts of recovered solids. From this mixture there were formed three pipe samples having an outside diameter of 7.18 inches and an inside diameter of 5.78 inches and a length of 12 inches by forming a wet web on a cylinder-like paper making machine and rolling the ply convolutely on a mandrel having an outside diameter of 5.76 inches. Immediately after the three pipe samples were formed, they were transferred with mandrel in place from the pipe forming machine to a tank containing a refined paraffinic oil which had been heated to a temperature of 180° F. by low pressure steam coils. The pipes were immersed in the oil, which was maintained at its 180° F. temperature, by hanging the mandrels which supported the pipes from two end hooks, one engaged with each end of the mandrel, which were connected to a horizontal bar which spanned the width of the tank and rested on the lips of the tank. The three pipes were allowed to cure in the oil for different periods of time, one for one hour, one for two hours, and the remaining pipe for four hours. After curing each of the pipes for its allotted time period, it was removed from the oil, the mandrel was stripped, and the pipe was subjected to a wet crush test. By measuring the crush strength of three pipes cured for different periods of time, it was possible to determine the rate of strength development of the pipes, which in turn is an indication of the rate at which the cement in the composition is hydrating since no loss of water by evaporation has taken place. Crush strength was determined by the standard ASTM C-500 except that the rate of loading was regulated to compensate for the variable section deformation at the point of ultimate strength. The ultimate load was recorded as the crush strength in pounds per foot.

The crush strength of the pipes is reported in Table I below wherein there is also listed the crush strength of pipes formed from the same composition and in the same way as the oil immersion cured pipes, but cured by three different methods. One method involved curing pipes in the presence of air under the temperature and humidity conditions indicated in the table. A second method involved curing the pipes by immersing them in a tank of water which had been heated to and was maintained at a temperature of 180° F. A third method involved wrapping each of the pipes in a water impermeable polyethylene film and curing the plastic wrapped pipes in heated air having a temperature of 175° F.–180° F. Wrapping the pipe in a water impermeable plastic film does not totally prevent water from evaporating from the pipe as heat is transferred into the pipe through the film, but it does impede the evaporation, and the water that does evaporate is trapped between the surface of the pipe and the plastic film. The result is that the air between the film and the surface of the pipe becomes totally saturated with water so that in essence the pipe is being cured in heated air which has a relative humidity of 100 percent. The crush strength of the pipes cured according to this plastic wrap method is reported under the column "175–80° F. at 100% R.H." There is also reported in Table I the crush strength of pipes formed as described above, but subjected to the wet crush test immediately after forming and thus before any significant amount of cement set.

TABLE I

| Time Cured, Hours | Crush Strength, Lbs./Ft. | | | | |
|---|---|---|---|---|---|
| | Air Temperature and Humidity | | | Heated Liquid and Temperature | |
| | 60° F. at 60% R.H. | 175-80° F. at 5-10% R.H. | 175-80° F. at 100% R.H. | Water at 180° F. | Oil at 180° F. |
| 0 | 90 | 90 | 90 | 90 | 90 |
| 1 | 300 | 450 | 625 | 710 | 885 |
| 2 | 425 | 875 | 1,625 | 1,540 | 1,990 |
| 4 | 550 | 1,650 | 3,050 | | 3,945 |

It readily can be seen from Table I above and FIGURE 1 which graphically pictures the data included in Table I that the crush strength of the pipes cured in the oil developed at a much faster rate than the pipes cured in air and at a substantially faster rate than the pipes cured in water or the plastic-wrapped pipes even though the curing for each of the methods was effected at the same environmental temperature, i.e., about 180° F. This is evidence that the water of hydration is maintained in the compositions during the curing and that the rate of hydration of the cement is indeed accelerated when cement compostions are cured according to the method of this invention. Additional evidence that the water of hydration was maintained in the pipes cured in the oil was that the cured pipes weighed substantially the same as the wet pipes.

In Tabe II below, there is reported the crush strength of pipes that were subjected to the crush strength test after they were substantially hydrated by high pressure steam curing. The pipes were formed from the composition and by the method set forth in Example 1 above. Prior to autoclaving, the pipes were cured by each of the methods described above for a period of about two hours. The pipes were then autoclaved for ten hours under a pressure of 125 p.s.i.g. After removal from the autoclave, the crush strength was determined.

TABLE II

| Method of Curing: | Crush strength lbs./ft. |
|---|---|
| Air cured pipe at 60° F. and 60% R.H. | 7230 |
| Air cured pipe at 175–80° F. and 5–10% R.H. | 7000 |
| Air cured pipe at 175–80° F. and 100% R.H. | 7350 |
| Water-immersed cured pipe at 180° F. | 7030 |
| Oil-immersed cured pipe at 180° F. | 7800 |

The results reported in the table above demonstrate a striking improvement attained by immersion curing in accordance with the present invention. Thus, with the article initially cured by the oil immersion technique, the crush strength was as much as from about 450 lbs. to 800 lbs. higher than the other samples when the articles are cured for the same total length of time. This represents a percentage increase in strength in some instances even greater than 10%.

If desired, the overall curing time can be reduced by as much as several hours and still achieve a good quality product of strength comparable to that secured by other techniques.

It should be noted that when water is used as the curing liquid, the final product strength of the article is substantially lower than the oil-cured article. It is believed that during the initial curing of the article in water, the water enters and swells the wet cement composition thereby weakening its physical structure.

Although, as above indicated, curing by water immersion is ordinarily subject to distinct disadvantages, it is quite possible to use water curing following a period of curing in a water-immiscible liquid in accordance with the practice of the present invention. Thus, an article may be cured in a water-immiscible liquid for a relatively short time, for instance for about one hour at 180° F., and thereafter the curing of the article may be continued by immersion in water without encountering swelling or other problems such as mentioned above.

Still further, it is quite practical to utilize various other curing techniques following an initial cure in the water-immiscible liquid, in accordance with the present invention, an example of such procedure being referred to elsewhere in this specification where description is given of initial curing in a water-immiscible liquid, followed by high pressure steam curing.

Figure 2:
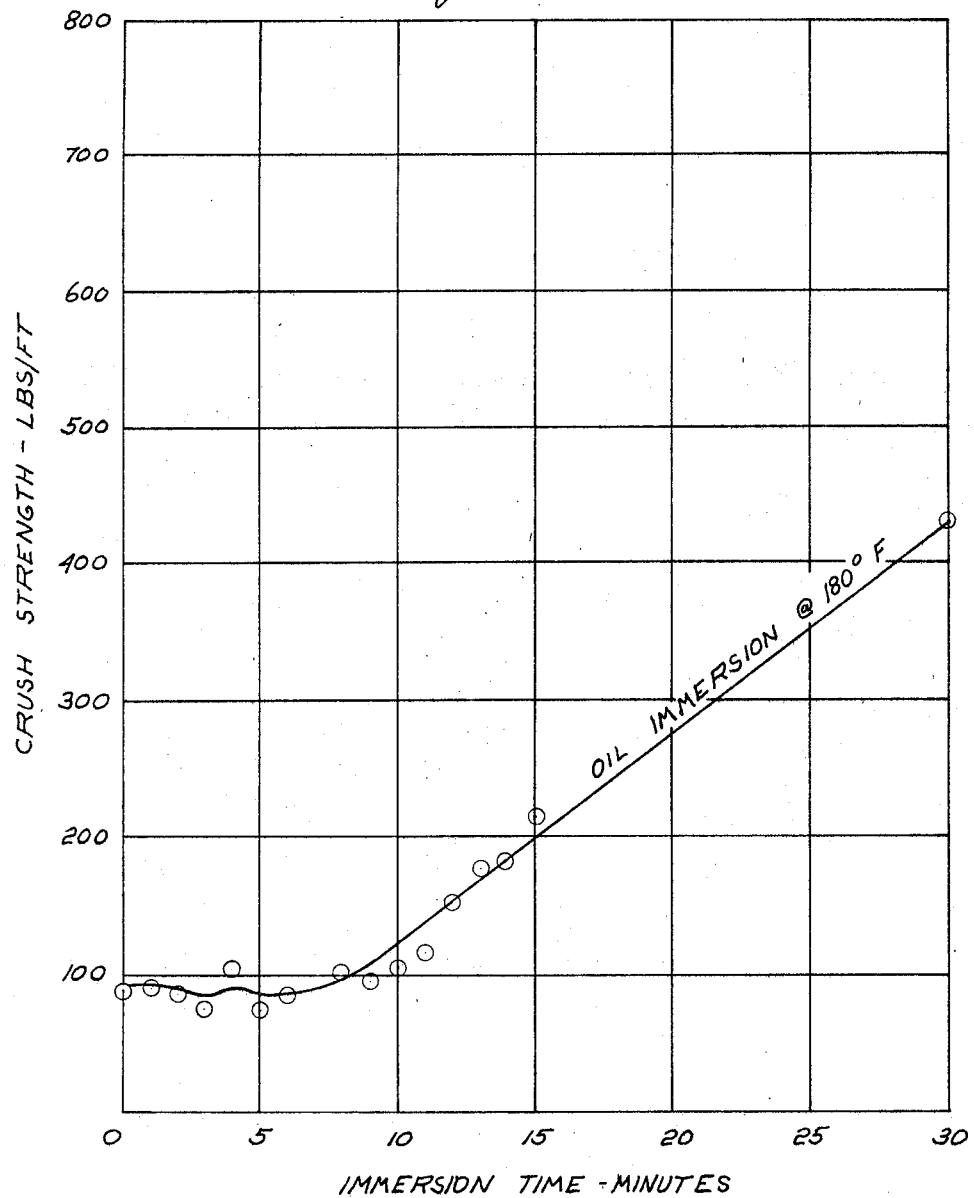
FIGURE 2 is a graph showing the development of strength in wet asbestos-cement pipes cured according to the method of this invention during the initial stages of curing.

As mentioned hereinabove, a period of time elapses after the cement or asbestos-cement article has been immersed in a heated water-immiscible liquid before the article begins to develop strength. FIGURE 2, which shows the pattern of development of strength during the initial stages of a curing operation, illustrates this. The graph of FIGURE 2 was plotted by determining the crush strength developed in 16 pipe samples which were immersed immediately after they were made according to the method set forth in Example 1 in a refined paraffinic oil having a temperature of 180° F. and which were cured for different periods of time as indicated by the o's on the graph. The crush strength was determined according to the method set forth in Example 1.

From the graph of FIGURE 2, a striking factor is immediately observable, namely, that no appreciable increase tin crush strength occurred until after about nine or ten minutes of immersion, and indeed, during the first few minutes of immersion, there was actually a slight decrease in crush strength. However, after nine or ten minutes of immersion, the rate of crush strength increased substantially linearly to the maximum point represented by this particular test, that is about 425 lbs. per foot in thirty minutes.

Whatever the reasons might be that the increase in crush strength was not significant until the passage of some appreciable time in the oil bath, it is clear that some time is needed, and the invention contemplates maintaining the articles in the immersion bath for at least sufficient time to advance the hydration to the point where the articles would be self-supporting and have some appreciable increase in strength.

In Table III below, there is listed the crush strength of asbestos-cement pipes which were immersion cured for one-half hour at 195° F. in various of the preferred oils of this invention. These oils generally have the combination of properties, previously discussed, which make them particularly suitable liquids for curing. The pipes that were cured were laminar, one foot in length, and had a wall thickness of 0.700 inch.

TABLE III

| Oil | Viscosity at 75° F., centipoises | Crush strength, Lbs./Ft. |
|---|---|---|
| Atlantic ARPROL, a paraffinic oil | 5 | 625 |
| Texaco Quench-Tex 500, a refined paraffinic oil | 31 | 635 |
| Texaco Hydra Oil, a refined paraffinic oil | 35 | 700 |
| Gulf Security #53, a refined paraffinic oil | 100 | 630 |
| Mobil Naprex #38, a naphthenic oil | 32 | 695 |

In Table IV below there is shown the results of immerson curing laminar abestos-cement pipes in refined paraffinic oil at various temperatures. The pipes were one foot in length and had a wall thickness of 0.700″. The oil that was utilized was a refined paraffinic oil (Texaco Quench-Tex 500).

TABLE IV

| Time Hours | Crush Strength, Lbs./Ft. | | |
|---|---|---|---|
| | Oil Temperature | | |
| | 160° F. | 180° F. | 200° F. |
| 0 | 86 | 91 | 75 |
| 0.25 | | 214 | |
| 0.5 | | 430 | |
| 1.0 | 668 | 884 | 1,019 |
| 1.5 | | 1,536 | |
| 2.0 | 1,330 | 1,989 | 2,305 |
| 3.0 | 2,080 | 3,062 | 2,935 |

Cement hydration approximates a second order chemical reaction and consequently, the rate of reaction should theoretically double for every increase in temperature of 27° F. It was therefore expected that the crush strength of the asbestos-cement pipes would develop at a faster rate at higher curing temperatures (as explaned hereinabove, the rate of development of crush strength is an indication of cement hydration) as exemplified by curves 1 and 2 of FIGURE 3 which graphically pictures the data of Table IV. It was therefore surprising and unexpected that the rate of development of crush strength in the asbestos-cement pipe cured at 200° F. began to decrease after about two hours of immersion as clearly shown by curve 3 of FIGURE 3. As previously explained, it is believed that the water in the asbestos-cement composition begins to boil under these conditions and the expanding steam disrupts the cement gel formed during the curing thereby reducing the strength of the article. Thus, the increased rate of curing obtained under these conditions appears to be more than off-set by structural weakening of the composition due to the boiling water. On the other hand, it should be noted that comparison of the strength developed in the pipes cured at 160° F. and 180° F. shows that cement was hydrating at a rate approximating a second order chemical reaction.

In Table V below there is reported the crush strength of pipes that were cured in various other kinds of water-immiscible liquids. The pipes were made from the same composition as set forth in Example 1 and had a wall thickness of 0.700″. The pipes were immersed in the liquid almost immediately after being made and were retained in the bath for thirty minutes and the average temperature of the liquid during the period of immersion was 167° F. Crush strength was determined by the method set forth in Example 1.

TABLE V

| Water-immiscible liquid | Crush strength, lbs./ft. |
|---|---|
| Silicone oil, viscosity 50 centistokes, SF–1093, General Electric | 386 |
| Refined aromatic oil, Mobilsol 66, Mobil | 404 |
| Fluorocarbon, Freon BF, E. I. du Pont de Nemours & Co. | 459 |
| Mixture of diphenyl and diphenyl oxide, Dowtherm A, Dow Chemical Co. | 401 |
| Orthochlorobenzene, Dowtherm E, Dow Chemical Co. | 391 |
| Neat's food oil (animal oil) Reilly-Whiteman-Walton Co. | 352 |
| Vegetable oil, Wesson Oil | 423 |
| Hydrogenated vegetable oil, Spry | 360 |

In Table VI below there is shown the results of curing asbestos-cement pipes and asbestos-cement box beams, both the pipes and box beams being formed by extrusion. The pipes were one foot long and had inside and outside diameters of 4.00 and 5.00 inches respectively. Each of the box beams was 4 feet long and the thickness of the cement was about 0.5 inch. The composition from which the pipes was formed was comprised of, in addition to water, 42.5 parts of Type I portland cement, 4 parts of lime, 31 parts of silica and 22.5 parts of chrysotile asbestos, and the box beams were formed from an aqueous-cement mixture comprised of 46.5 parts of cement, 31 parts of silica and 22.5 parts of chrysotile asbestos. The pipes and box beams were immersion cured in a refined paraffinic oil (Texaco Quench–Tex 500) having a temperature of 180° F. Similar pipes and box beams were also cured under ambient temperature conditions by wrapping the same in a water-impermeable polyethylene film. The crush strength test described hereinabove was utilized to determine the rate of strength development of the pipes as they cured. A flex test was utilized to determine the strength development of the box beams as they cured. The flex test consisted of center loading on 42-inch span with the flat top portion in tension.

TABLE VI

| Cure Time, Hours | Pipe, Crush Strength In Lbs./Ft. | | Box Beams, Flex, In Lbs. | |
|---|---|---|---|---|
| | Normal Cure | Oil at 180° F. | Normal Cure | Oil at 180° F. |
| 0 | 34 | 34 | 13 | 13 |
| 1 | 45 | 208 | 21 | 49 |
| 2 | 53 | 558 | 25 | 576 |
| 4 | 95 | 845 | 70 | 788 |
| 7 | 187 | | 190 | |
| 13 | 526 | | 682 | |
| 20 | 672 | | 709 | |
| 30 | 861 | | 804 | |

It can be seen from Table VI and and FIGURE 4 which graphically represents the data of Table VI that vast improvements are obtained by curing extruded cement compositions in hot oil. It took almost seven times as long for the pipes and box beams cured under humidified, ambient temperature conditions to develop the same strength as like articles cured by immersion. It will be noted from a comparison of FIGURE 4 with FIGURES 1, 2 and 3 that the rate of crush strength development of the extruded pipes was initially slower than the rate of crush strength development for laminar pipes. This is partly attributed to the presence of lime in the composition from which the extruded pipes were made, the lime being an extrusion aid, and a retarder of cement hydration. The slower initial cure of the extruded articles is also attributable to the shorter period of contact time between the cement and water in the extrusion operation as compared to the longer contact time between cement and water when forming laminar pipes.

Curing the shaped cement or fibrous-cement compositions according to the method of this invention provides numerous advantages over the methods heretofore known. It enables the cement article to be handled without deforming the same in much shorter periods of time. For example, the mandrels on which asbestos-cement pipes are formed can be stripped from the pipe when the pipe has developed a crush strength of about 3% of final product crushing strength and this strength is developed in less than one-half hour when curing the pipe in oil at 180° F., whereas, heretofore, in commercial operations the pipe had to be cured several times as long before such strength was obtained. Asbestos-cement pipes cured according to this invention can normally be machined when the crush strength has developed to approximately 50% of final product crushing strength. When curing pipes in oil at a temperature of 180° F., such strength can be obtained in about three and one-half hours, whereas heretofore pipes had to be high pressure steam cured or else cured under ambient temperature and humidity for several days to have this strength developed. This invention generally expedites the production of cement articles by greatly reducing the time necessary to cure the wet compositions. It eliminates the necessity for providing curing ovens or curing rooms, or heating tunnels for the curing, the apparatus presently needed for the curing of such articles. Because of the simplicity of the operation, maintenance and operating costs are reduced. It provides a method whereby the curing operation can be controlled to a high degree.

We claim:

1. In the production of a cement or fibrous-cement article, the method which comprises forming the article to the desired shape from an aqueous-cement composition in a condition having a consistency incapable of prolonged self-support in the shape of said article, while the composition is in said condition immersing the article in a water-immiscible liquid bath having a temperature between about 120° F. and 200° F., and maintaining the article in the desired formed shape in the bath for at least a period of time until the cement has become sufficiently set to render the article self-supporting.

2. In the production of an asbestos-cement pipe the method which comprises forming a pipe on a supporting mandrel from an aqueous-cement mixture, substantially immediately after the pipe has been formed, immersing the pipe as supported on the mandrel in a heated water-immiscible liquid bath having a temperature of from about 120° F. to about 200° F., maintaining the mandrel-supported pipe in the bath until the cement has set sufficiently to render the pipe self-supporting and thereafter stripping the mandrel from the pipe, and continuing the curing of the self-supporting pipe stripped of the mandrel in a heated water-immiscible liquid bath having a temperature of from about 120° F. to about 200° F.

3. A method according to claim 2 in which the curing of the self-supporting pipe is continued until the cement has set sufficiently to impart sufficient strength to the pipe so that upon transfer-handling it will resist damage, the method further including withdrawal of the pipe from the bath and subjecting the pipe to high pressure steam curing.

4. A method according to claim 2 in which the temperature of the liquid bath for at least the curing of the pipe while supported on the mandrel is from about 160° F. to about 180° F.

5. In the production of an asbestos-cement pipe the method which comprises forming a pipe from an aqueous-cement mixture, substantially immediately after the pipe has been formed immersing it in a heated water-immiscible liquid bath having a temperature of from about 120° F. to about 200° F., maintaining the pipe in the liquid bath for at least a period of time until the cement has set sufficiently to impart sufficient strength to the pipe so that upon transfer-handling it will resist damage, and removing the pipe from the liquid bath.

6. A method according to claim 5 in which the temperature of the liquid bath is from about 160° F. to about 180° F.

7. In the production of a cement or fibrous-cement article, the method which comprises forming the article to the desired shape from a hydratable aqueous-cement mixture having a consistency incapable of prolonged self-support in the shape of the article, supporting the article to maintain the article in its desired shape, and accelerating the hydration of the cement by heating the supported article while substantially all of its surface is covered with a water evaporation barrier, the barrier comprising a liquid which is substantially immiscible with water.

8. A method according to claim 7 in which the barrier comprises an oily liquid.

9. A method according to claim 1 in which the barrier comprises a refined mineral oil.

10. In the production of cement or fibrous-cement shapes, the method which comprises forming the shape from a water-cement mixture, and hydrating the cement by immersing the article in a substantially water-immiscible liquid and heating the article while so immersed for a period of time sufficient to advance the hydration to the point where the article is self-supporting.

11. In the production of a fibrous-cement article, the method which comprises forming the article to the desired shape from an aqueous composition containing the following constituents in the amounts indicated:

| | Parts by weight based on 100 parts of dry ingredients |
|---|---|
| (a) Hydraulic cement | 10–90 |
| (b) Asbestos | 10–50 |
| (c) Auxiliary cement agents | Up to 50 | immersing the formed article in a water-immiscible liquid bath having a temperature between about 120° F. and 200° F. and retaining the article in the heated liquid bath for a period of time of at least ten minutes and until significant hydration of the cement has been effected.

12. A method according to claim 5 wherein the pipe is subjected to high pressure steam curing after it has been removed from the liquid bath.

13. A method according to claim 10 wherein the heating is continued until the article will resist damage upon transfer-handling.

14. A method according to claim 10 wherein the heating is continued until the cement has hardened sufficiently to allow the article to be put to its intended use.

References Cited

UNITED STATES PATENTS

| | | |
|---|---|---|
| 732,674 | 6/1903 | Bell et al. |
| 2,084,354 | 6/1937 | Morbelli. |
| 2,329,184 | 9/1943 | Cann. |
| 2,963,765 | 12/1960 | Tillman _____ 264—79 |
| 2,978,782 | 4/1961 | Wagner _____ 264—56 |

JULIUS FROME, *Primary Examiner.*

J. R. THURLOW, *Asssistant Examiner.*

U.S. Cl. X.R.

264—330, 133; 106—12

UNITED STATES PATENT OFFICE

CERTIFICATE OF CORRECTION

Patent No. 3,428,721 February 18, 1969

Joseph C. Jackson et al.

It is certified that error appears in the above identified patent and that said Letters Patent are hereby corrected as shown below:

Column 5, line 57, "compisition" should read -- composition --. Column 6, line 47, after "fluorocarbons," insert -- diphenyl, --. Column 9, line 25, "seerves" should read -- serves --. Column 11, line 61, "tin" should read -- in --. Column 13, line 53, cancel "and", second occurrence. Column 15, line 11, the claim reference numeral "1" should read -- 7 --; line 29, "cement" should read -- cementing --.

Signed and sealed this 7th day of April 1970.

(SEAL)
Attest:

Edward M. Fletcher, Jr.
Attesting Officer

WILLIAM E. SCHUYLER, JR.
Commissioner of Patents